June 25, 1968 R. L. PECK 3,390,313

ELECTROMECHANICAL DEVICES USING IONIC SEMICONDUCTORS

Original Filed Aug. 25, 1961 3 Sheets-Sheet 1

INVENTOR.
ROBERT L. PECK
BY
Anderson, Spangler & Wymore
ATTORNEYS

ELECTROMECHANICAL DEVICES USING IONIC SEMICONDUCTORS

Original Filed Aug. 25, 1961

3 Sheets-Sheet 2

INVENTOR.
ROBERT L. PECK
BY
Anderson, Spangler & Wymore
ATTORNEYS

ELECTROMECHANICAL DEVICES USING IONIC SEMICONDUCTORS
Original Filed Aug. 25, 1961 3 Sheets-Sheet 3
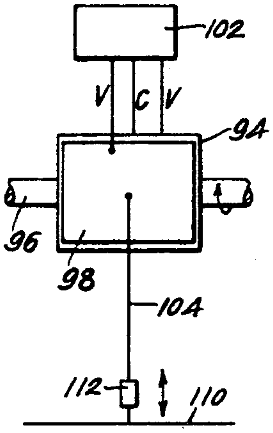
FIG. 20.
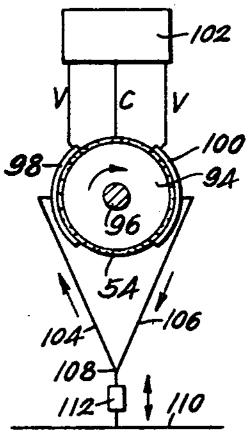
FIG. 21.
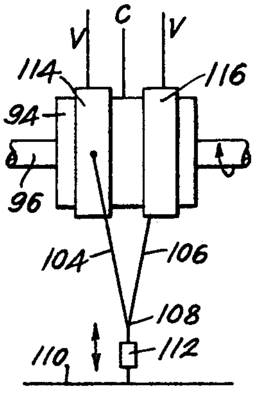
FIG. 22.
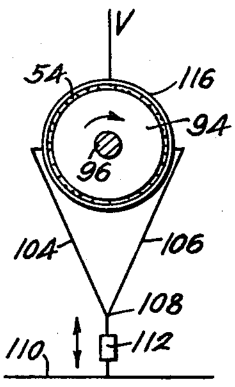
FIG. 23.
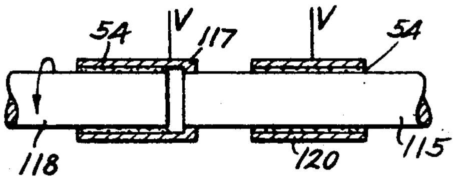
FIG. 24.
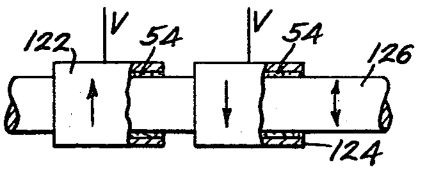
FIG. 25.
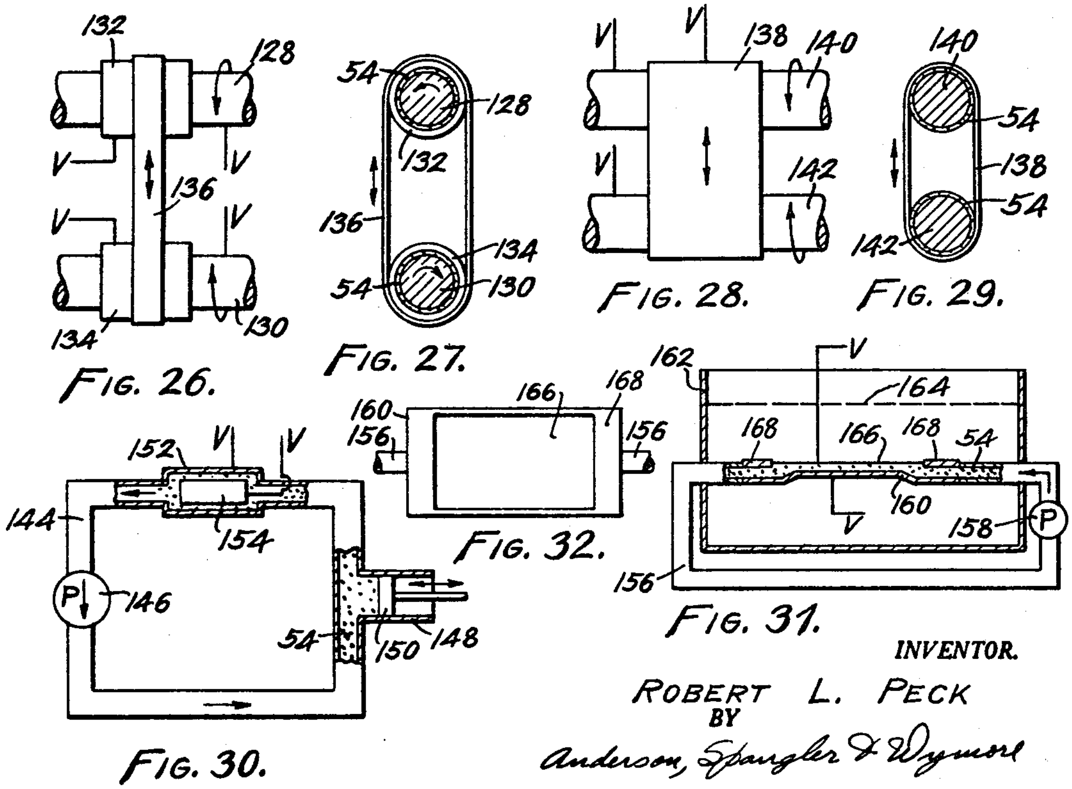
FIG. 26, FIG. 27, FIG. 28, FIG. 29, FIG. 31, FIG. 32
FIG. 30.
INVENTOR.
ROBERT L. PECK
BY
Anderson, Spangler & Wymore
ATTORNEYS

3,390,313
ELECTROMECHANICAL DEVICES USING IONIC SEMICONDUCTORS

Robert L. Peck, Woodbridge, Conn., assignor, by mesne assignments, to Textron Electronics, Inc., Providence, R.I., a corporation of Delaware Original application Aug. 25, 1961, Ser. No. 133,874. Divided and this application Aug. 2, 1965, Ser. No. 479,038
9 Claims. (Cl. 317—262)

This application is a division of my application Ser. No. 133,874, filed Aug. 25, 1961, now abandoned.

This invention relates to electrical and electromechanical devices incorporating and using ionic semiconductors as an element thereof.

An object of the present invention is to provide novel transducers incorporating and using ionic semiconductors as an element thereof.

In the figures:

FIGURE 20 is a view in elevation of an acoustical radiator embodiment utilizing the teaching of the present invention.

FIGURE 21 is an end view of the embodiment of FIGURE 20;

FIGURE 22 is a view in elevation of another acoustical radiator embodiment in accordance with the invention;

FIGURE 23 is an end view of the embodiment of FIGURE 22;

FIGURE 24 is a view in elevation, partly in section, of one form of a shaft clutch arrangement according to the invention;

FIGURE 25 is a view in elevation, partly in section, of another embodiment of a clutch arrangement according to the invention;

FIGURE 26 is a view in elevation of a continuous band passing over a pair of sleeves mounted concentrically on a pair of oppositely rotating shafts and adapted to be coupled thereto in accordance with the teachings of this invention;

FIGURE 27 is an end view of the embodiment of FIGURE 26;

FIGURE 28 is a view in elevation of a continuous band passing over a pair of oppositely rotating shafts and adapted to be respectively coupled thereto in accordance with the teachings of this invention;

FIGURE 29 is an end view of the embodiment of FIGURE 28;

FIGURE 30 is a diagrammatic illustration of one form of sonic generator according to the invention;

FIGURE 31 is a view in elevation, partly in section, of another form of sonic generator system embodying the teaching of this invention; and, FIGURE 32 is a plan view, with parts broken away to conserve space, of the system of FIGURE 30 showing the positioning of the transducer.

The ionic semiconductors referred to herein are related to the relatively recent work in the field of hydrogen bonding and the transfer of electrical charge by protons. It is found that hydrogen ions or protons can transport charges much in the manner as electrons at extremely high velocities. Protons appear to have the ability to "tunnel" through potential barriers in much the same way as electrons for even higher effective velocities.

A proton donor is a molecule capable of liberating one or more of its protons by application of external energy or forces. Such molecules are known as hydrogen bonding acids such as phenols, amides, amines, water and the like.

A proton acceptor is essentially a non-ionized molecule capable of forming a weak bond with the proton liberated by the proton donor. Molecules which are not dissociated to an extent to form an irreversible ionic bonding with a free proton fulfill the requirement of a proton acceptor within the present teaching. Molecules which fulfill the above requirements are found to be hydrocarbons, carbon tetrachloride, alcohols, xylene and the like.

An inert particle is one which is chemically and physically stable.

Figure 1:
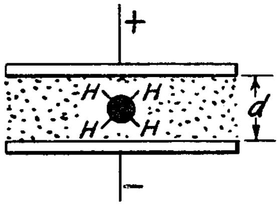
FIGURE 1 illustrates a non-conducting particle suspended in a poor conducting medium and having hydrogen atoms bound thereto.

Assume a particle which is a carrier for proton donors suspended in a poor electrical conducting medium and having protons bound to the particle, FIGURE 1. These protons may be present, for example, in the water of hydration of the particle as in the case of silicon dioxide wherein a certain amount of water is associated with the silicon dioxide molecule, ($SiO_2 . nH_2O$). The proton donors may be adsorbed or absorbed at or near the surface of the particle.

The proton is bound to the proton donor molecule by ionic bonds, the strength of which is inversely proportional to the dieelectric constant of the surrounding medium, given by the approximate equation $$(1) \qquad F=\frac{q^{-} \cdot q^{+}}{\epsilon r^2}$$

where:

F is the attracting force;
$q^+$ is the charge on the bound proton;
$q^-$ is the charge on the donor molecule;
$r$ is the distance between charges; and,
$\epsilon$ is the dielectric constant.

If $\epsilon$ is relatively high as in certain proton acceptors, their F can be quite low and some disassociation can take place with small amounts of additional energy.

Figure 2:
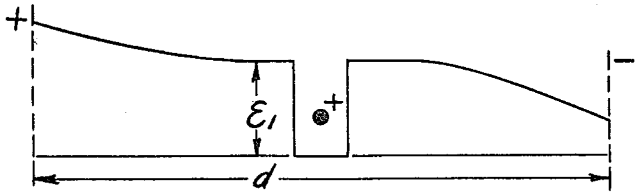
FIGURE 2 illustrates a diagram for the proton with the plates charged as in FIGURE 1 according to quantum mechanics.

From quantum mechanics, the diagram of FIGURE 2 is derived from the proton situated between plates charged as in FIGURE 1. $E_1$ is the energy required to remove the proton from its molecule, which is a function of the distance $r$ and the dielectric constant $\epsilon$ of the medium in which it exists. If $E_1$ can be supplied by thermal energy or from an electrical field developed between the plates, the proton is, in essence, lifted out of its potential well and rolls down hill to plate 2 where it is collected. Calculations show that extremely high voltages are necessary to supply $E_1$, unless $E_1$ is reduced by increasing the dielectric constant, $\epsilon$. Even where this is the case, the thermal energy remains the dominant factor. In addition to the thermal energy, a proton may receive additional energy from the collision of a field accelerated proton previously liberated (avalanche effect).

With a large number of bound protons in a medium at temperature T, some of the ions will have sufficient energy resulting from thermal energy to overcome $E_1$. The ratio of bound to unbound protons is found from the expression:

$$\frac{n_u}{n_b}=e^{\frac{-E_1}{KT}} \tag{2}$$

where:

$n_u/n_b$ is the ratio of unbound protons to bound protons;
$k$ is Boltzmann's constant;
T is the absolute temperature; and
$E_1$ is the proton bonding energy.

From the preceding considerations, the mechanics for removing protons from the particles are supplied, leaving a charge on the particles. There is, however, a time involved to lift a proton out of its bound state, called the production rate, which at lower temperatures may be quite small. Further, there is a time involved for the proton to go from the unbound to the bound state, i.e., jump back down its well. These times are also a function of the applied field. With no field applied to the molecule, one can consider that the protons are jumping in and out of the potential well at substantially the ratio of bound to unbound protons given by the preceding Boltzmann's relationship of expression (2). The times required for the liberation and capture plus effective velocities of the protons govern the upper frequency limit at which the compositions of this invention will operate. A "tunneling effect," which is a "majority carrier" effect, occurring at extremely fast rates compared with the other "carrier" effects further increases the frequency response.

Figure 3:
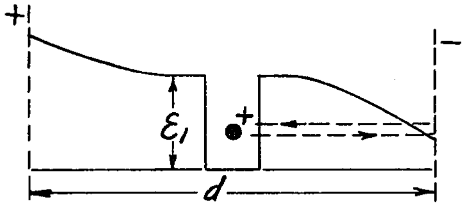
FIGURE 3 illustrates the tunneling effect of a proton.
Figure 4:
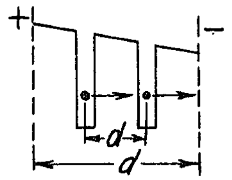
FIGURE 4 illustrates the tunneling effect of a number of protons positioned between the charged plates of FIGURE 1.

By tunneling, the proton need not have to be lifted out of the potential well and then move to the electrode or to an acceptor but tunnels through the potential barrier directly as illustrated by FIGURE 3. This process can occur quite rapidly and the effective velocity of the proton is extremely high. The distance between the proton and its acceptor is a limiting factor and if the distance is large, few protons will tunnel. However, if the particle population or density is increased so as to reduce distance between a proton and an acceptor the protons may tunnel from one potential well to the next since the distance is effectively reduced. A further method of charge transfer is present if the plates or electrodes are moving. The particles will likewise move and will come into contact with the plate or sufficiently close to permit proton transfer. The number of charges transferred by this method is fairly small and probably can be considered negligible for all practical purposes.

A new class of ionic semiconductors has been discovered which exhibit many interesting phenomena and characteristics capable of practical applications. These materials can be produced to exhibit strong electrostrictive properties, large changes in dielectric constant with change in the electrical E field applied, and large changes in viscosity of certain suspensions as an electric field is applied. These phenomena occur at extremely rapid rates and are nonlinear with respect to the applied E field making possible many practical applications.

Figure 5:
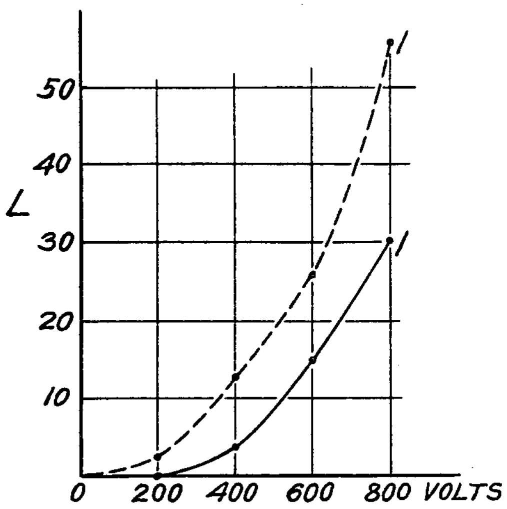
FIGURES 5 through 7 are graphical representations illustrating the effect of proton density on coupling force and conductivity in semiconductors.
Figure 6:
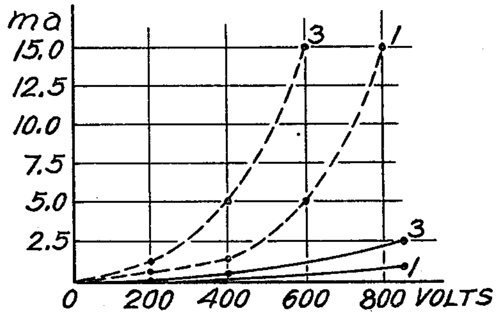
Figure 7:
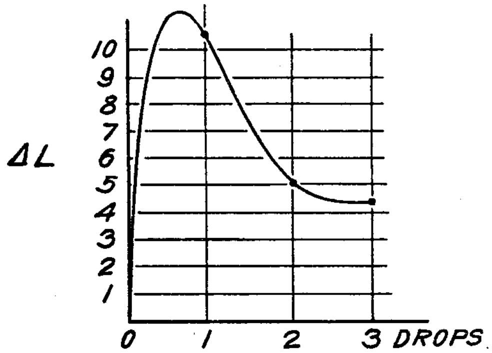

Several tests were conducted, the results of which are shown in FIGURES 5 through 7, to illustrate the effect of proton density in the semiconductor materials at standard temperature. FIGURES 5 and 6 show the effects of adding a proton donor, i.e. formic acid to 1 gm. $SiO_2$, which is then added to 24 cc. of xylene. These figures show a plot of torque, L, in gram centimeters, and current as a function of an applied voltage between electrodes having an area of 12.5 square centimeters spaced at 0.013 centimeter. The numbers on the curves refer to the number of drops of formic acid added to the 1 gram $SiO_2$ suspended in 24 cc. xylene.

FIGURE 7 shows a plot of change in torque, ΔL, vs. drops of formic acid. ΔL is defined as $$\Delta L=\frac{L800}{L400}$$

where L800 is the torque obtained at 800 volts applied field and L400 is the torque with an applied field of 400 volts. The plot shows the torque change rising to a peak as the concentration of proton donor is increased from zero.

FIGURE 5 shows a plot of the torque vs. the applied voltage for a single composition, containing 1 drop of formic acid. This is a characteristic curve of a family of curves for different amounts of formic acid. This same composition is plotted with 12 drops of aniline added to the xylene and is shown by means of a dotted line.

FIGURE 6 shows a plot of current vs. voltage for the compositions of FIGURE 5 and additionally the plot of current vs. voltage of a composition containing 3 drops of formic acid and 4 drops of aniline, again the plot of the aniline containing compositions being shown dotted. This figure shows that as the proton density is increased, the conductivity is increased at a given voltage with a given population density of the proton donor.

From the theoretical considerations and test data, it evolves that the semiconductor compositions of this invention will comprise a carrier of low electrical conductivity, relatively high electrical breakdown strength, predetermined initial viscosity and medium dielectric constant to which is added particles of a material that will adsorb or absorb proton donors or other material carrying a proton donor. The particle and proton donor densities is determinable by theory and simple experiment for a given application at a particular temperature. Referring again to FIGURE 5, it will be seen that the composition depicted therein has a change in torque L of greater than 100 to 1 as the applied field E is varied. The dotted line on FIGURE 5 shows the plot for the same composition to which has been added 12 drops of aniline which serves to increase the proton acceptor population density resulting in even greater changes in torque for the applied voltage.

Examples of compositions which may be used to follow the teachings of this invention are:

$NaHCO_3.nH_2O$ suspended in mineral oil,
$SiO_2$ and triethylamine suspended in mineral oil,
$SiO_2$ and phenol suspended in carbon tetrachloride,
$SiO_2$ and formic acid suspended in xylene and aniline,
$TiO_2$ and ammonium hydroxide suspended in mineral oil.

The viscosity change of the compositions according to the invention has been experimentally varied by factors exceeding five hundred with an initial viscosity of the composition being less than about 30 centipoises at standard temperature. Coupling forces have been obtained using the compositions of the invention approaching about 5 pounds per square inch between plates with frequency variation of the applied field to 20 kc. and higher. An electrostrictive fluid in accordance with the present teaching displays an activity many times greater than the activity of barium titanate. A capacitor was constructed using the teaching of the invention in which the capacitance was variable from about 0.001 $\mu$fd. to better than about 0.002 $\mu$fd.

Figure 8:
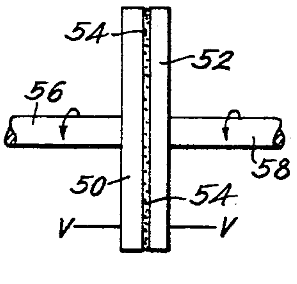
FIGURES 8 through 15 illustrate diagrammatically various combinations of selected materials for the coupling elements useful in carrying out the invention.

FIGURES 8 through 15 illustrate various forms which the basic transducers of the invention may take to incorporate the new semiconductor materials. FIGURE 8 shows a pair of plates 50 and 52 having sandwiched therebetween a liquid semiconductor composition 54 according to the instant teaching. Plates 50 and 52 are constructed of material of good electrical conducting properties and are attached, respectively, to a shaft 56 and 58. When a voltage V is impressed across plates 50 and 52 an increase in the viscosity of composition 54 results, increasing the coupling between plates 50 and 52 through composition 54.

Figure 9:
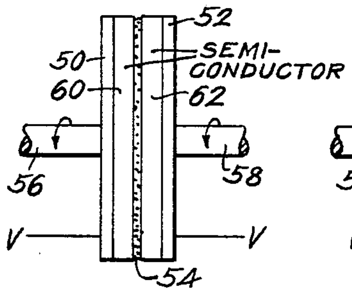
Figure 10:
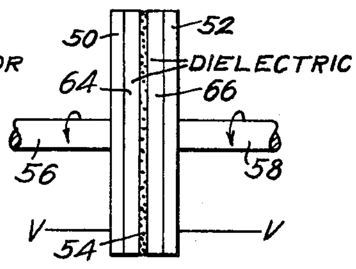

FIGURE 9 is directed to a modification of the transducer of FIGURE 8 wherein plates 50 and 52 are each provided with a layer of semiconductor material 60 and 62, such as germanium, silicon, carbon and the like, on the adjacent faces. FIGURE 10 is likewise a modification of FIGURE 8 wherein the plates are each similarly provided with a layer of a dielectric material 64 and 66. The semiconductor and dielectric layers increase the coupling effect of composition 54 on application of an alternating voltage V. The dielectric material 64 and 66 is preferably one with high polarization. The semiconductor and dielectric layers appear to allow an intensification in the field across the plates resulting from the impressed voltage and further acts as an automatic current limiting device to reduce danger of breakdown.

Figure 11:
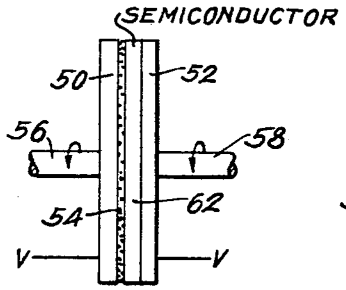
Figure 12:
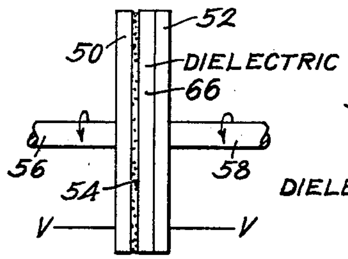

FIGURES 11 and 12 illustrate modifications with only one plate having a layer of the semiconductor composition and other plates provided respectively with a semiconductor layer and a dielectric layer.

Figure 13:
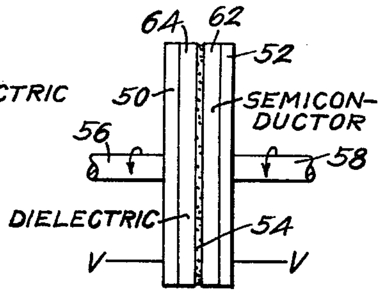

FIGURE 13 illustrates one plate with a semiconductor layer and the other plate with a dielectric layer leaving a layer of the composition of the invention therebetween.

Figure 14:
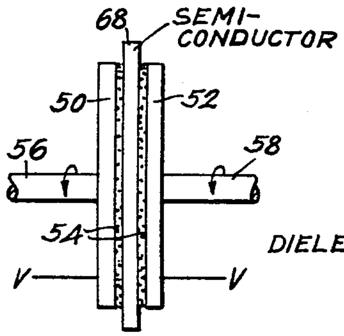
Figure 15:
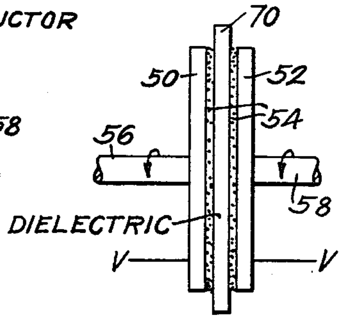

FIGURES 14 and 15 illustrate embodiments wherein a free running plate 68 and 70, respectively, of a semiconductor and a dielectric is sandwiched between plates 50 and 52 wherein the semiconductor composition 54 is positioned intermediate plates 50, 52 and the free running plate.

Figure 19:
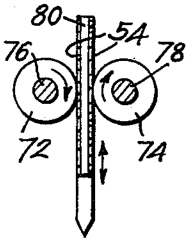
FIGURE 19 is an end view of the embodiment of FIGURE 18.
Figure 18:
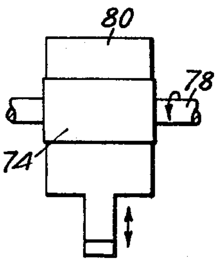
FIGURE 18 is a view in elevation of still another embodiment according to the present invention.

FIGURES 18 and 19 illustrate, respectively, an elevation and a side view of another type of transducer according to the invention wherein there are provided cylinders 72 and 74, respectively connected to shafts 76 and 78 rotating in opposite directions. A planar element 80 is positioned intermediate the rotating cylinders and carries a layer of semiconductor composition 54 on each surface thereof in contact with a cylinder. When a voltage is impressed between the planar element 80 and a cylinder, the planar element will be transported in the direction of rotation of that cylinder through the coupling action of composition 54. It will be seen that if the impressed voltage be switched alternately between cylinders, the planar element 80 will be transported alternately in the direction of rotation of each cylinder at the rate of switching.

Figure 16:
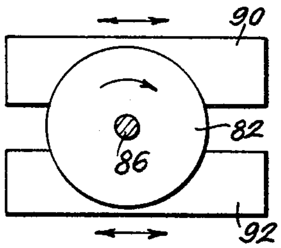
FIGURE 16 is a view in elevation of another embodiment according to the present invention.
Figure 17:
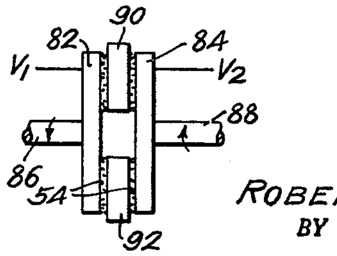
FIGURE 17 is an end view of the embodiment of FIGURE 16.

FIGURES 16 and 17 show a modification of the structure of FIGURES 18 and 19, wherein there are provided a pair of discs 82 and 84 connected to shafts 86 and 88 rotating in opposite directions. A pair of free running elongated elements 90 and 92 are sandwiched between plates 82 and 84 at diametrically opposed positions. Layers of the semiconductor composition 54 are interspersed between plates 82 and 84 and elements 90 and 92. On application of a potential between one of the plates and the elements, the elements are coupled to the respective plates through the semiconductor composition causing the elements to move oppositely in one direction and when a potential is applied between the other plate and the elements, the elements move oppositely in the other direction. Alternately applying the potential to one plate and then the other causes elements 90 and 92 to oscillate at the switching rate.

FIGURES 20 and 21 are respectively an elevation and an end view of another transducer arrangement incorporating the semiconductor according to this invention. A drum 94 is connected to a rotating shaft 96. A pair of diametrically opposed arcuate plates 98 and 100 are positioned adjacent drum 94 and a layer of semiconductor composition 54 separates the drum and the plates. The plates are each connected to one side of a push-pull generator 102 output V with the common C of the generator connected to drum 94. Links 104 and 106 are connected respectively to plates 98 and 100, and the links are connected together at some point 108 remote of drum 94. Connecting point 108 is coupled to a surface 110, such as a floor, wall and the like. A weight 112 may be added to provide proper loading of the transducer. When a signal is applied alternately to plates 98 and 100 from generator 102, the energy of rotating drum 94 is coupled to surface 110 through the linkage in accordance with the switching rate or frequency of the modulating signal, thus the surface 110 will vibrate in accordance with the signal applied to the plates.

FIGURES 22 and 23 show a somewhat similar arrangement except that sleeves 114 and 116 are used to couple the drum 94 with the linkage 104 and 106 and surface 110. These transducers can be used to couple a generator to a surface to produce vibrations therein at great power under the control of a small signal. Audio signals have been reproduced through the upper range of audibility by modulating a transducer with a signal source wherein the entire wall or walls of a building serve as the radiating source.

FIGURES 24 and 25 relate to power transmission systems. FIGURE 24 shows a brake and a clutch. A driven shaft 115 is provided with a sleeve 117 attached to the end thereof by suitable means to extend beyond the end of the shaft to form a coupling. A driving shaft 118 is positioned concentrically within sleeve 117 with a layer of semiconductor composition 54 therebetween. When a voltage is impressed between sleeve 117 and shaft 118, the motion of the shaft is coupled to sleeve 117 and thus transmitted to the driven shaft 115. Driven shaft 115 is provided with a brake sleeve 120 positioned therearound and secured against movement. The space between sleeve 120 and shaft 115 is occupied by a semiconductor composition 54. When a voltage is impressed between sleeve 120 and shaft 115, the coupling therebetween through composition 54 serves as a brake.

FIGURE 25 shows two power driven sleeves 122 and 124 rotating in opposite directions about shaft 126 and separated therefrom by a layer of the semiconductor composition 54. On application of a voltage between one of the sleeves and the shaft, the shaft is coupled to the sleeve and driven in the same direction. Energizing the other sleeve acts as a brake and serves as a means to drive the shaft in the opposite direction.

FIGURES 26 and 27 relate to one from of a drive for an oscillograph and the like. Shafts 128 and 130 are driven to rotate in opposite directions. Sleeves 132 and 134 are mounted respectively on shafts 128 and 130 for free movement and are separated therefrom by a layer of semiconductor composition 54. A wire belt or band 136 is positioned in engaged relation on sleeve 132 and 134 which act as pulleys. Band 136 may carry an inked pen as is well-known in the art. The application of a potential between a sleeve and its respective shaft couples the sleeve to the shaft through composition 54 driving the sleeve and the band in the direction of rotation of the shaft.

FIGURES 28 and 29 relate to a modification of the oscillograph drive of FIGURES 26 and 27, wherein a band 138 is of a conductor material and the layer of semiconductor composition 54 is positioned between band 138 and driven shafts 140 and 142.

FIGURE 30 illustrates one form of an ultra-sonic transducer utilizing the teachings of the invention. There is shown a closed liquid circuit made up of a conduit 144 including a pump means 146 in series therewith. At some point in the conduit a cylinder 148 is connected thereto containing a piston or diaphragm 150. Also is series with conduit 144 is a transducer 152, the housing of which acts as one electrode and contains a centrally positioned restricting electrode 154. Conduit 144 is completely filled with liquid semiconductor composition 54. When a voltage is impressed between the housing of transducer 152 and the restricting electrode, a valving action takes place in the transducer due to the increase in viscosity of the semiconductor liquid at that point. The change in viscosity takes place at the frequency of the switching rate of application of voltage to the transducer. The intermittent valving action of transducer 152 produces rapid pressure changes in cylinder 148 to which the piston or diaphragm 150 is responsive to drive a load attached thereto at the frequency of the switching rate. The housing of transducer 152 may be insulated from the conduit 144 by suitable means.

FIGURE 31 is directed to another embodiment of an ultra-sonic transducer system according to the teaching of this invention. A closed liquid circuit is provided to include conduit 156 with pump 158 and transducer 160 in series. Transducer 160 is positioned within a tank 162 below the normal liquid level 164, shown dotted. FIGURE 32 is a plan view of transducer 160 which is shown to be of a flattened configuration to provide a substantial area. The top of the transducer is provided with a thin flexible metallic membrane 166 which serves as one electrode and is electrically insulated from the balance of the transducer serving as the other electrode. The entire system is filled with a liquid semiconductor compositon 54 according to the invention. When a voltage is impressed across the transducer, creating an electric field, the change in viscosity of the liquid semiconductor produces a valving action on the flow created by pump 158. Membrane 166 being flexible expands with convex curvature on application of the field and relaxes when the field is cut off. When the electric field is switched on and off, the membrane vibrates at the frequency of the switching rate and couples the resulting vibrations to a liquid contained in tank 162. The switching rate may be varied to include the ultra-sonic region and the transducer may be used to generate ultrasonic vibrations for cleaning or other well-known purposes. In the embodiments of FIGURES 30 and 31, the power generated is a function of the mechanical forces driving the pump which can have great magnitude controllable by a relatively small signal voltage.

While there have been described what at present are considered to be the preferred embodiments of this invention, it will be obvious to those skilled in the art that various changes and modifications may be made therein without departing from the invention. It is aimed therefore in the appended claims to cover all such changes and modifications which fall within the true spirit and scope of the invention.

What is claimed is:

1. An electromechanical transducer device comprising a pair of current conducting elements having sandwiched therebetween a quantity of a viscous ionic semi-conductor composition which changes its viscosity in response to an applied electric field, means for connecting a source of electrical energy across the elements to produce an electrical field therebetween through the semi-conductor composition, and a dielectric layer separating at least one of said elements from said composition.

2. An electromechanical transducer device comprising a pair of electrodes mounted for relative movement in spaced apart relation, means for confining in the space between the electrodes a quantity of a viscous ionic semiconductor composition which changes its viscosity in response to an applied electric field, means connected to said electrodes for coupling them to a source of electric energy, and a dielectric layer within said space joined to at least one of said electrodes for separating it from said composition.

3. An electrical device comprising a pair of electrodes mounted in spaced apart relation, means for enabling the space between the electrodes to be occupied by a quantity of a viscous ionic semi-conductor composition which changes its viscosity in response to an applied electric field, means connected to said electrodes for coupling them to a source of electric energy, and a dielectric layer within said space joined to at least one of said electrodes for separating it from said composition.

4. An electrical device comprising a pair of electrodes mounted in spaced apart relation, means for enabling the space between the electrodes to be occupied by a quantity of a viscous ionic semi-conductor composition which changes its viscosity in response to an applied electric field, means connected to said electrodes for coupling them to a source of electric energy, and at least one layer of solid material arranged within said space such that all of the electric current that passes between said electrodes through said viscous composition must pass through said layer, said solid material being selected from the class of materials consisting of semiconductors and dielectrics.

5. An electrical device according to claim 4, wherein a layer of semiconductor material is joined to each of said electrodes separating them from said viscous composition.

6. An electrical device according to claim 4, wherein a layer of dielectric material is joined to each of said electrodes separating them from said viscous composition.

7. An electrical device according to claim 4, wherein a layer of semiconductor material and a layer of dielectric material are joined, respectively, to a different one of said electrodes separating them from said viscous composition.

8. An electrical device according to claim 4, wherein a layer of semiconductor material is spaced from both of said electrodes within the space therebetween for dividing the viscous composition into two separated quantities on opposite sides thereof.

9. An electrical device according to claim 4, wherein a layer of dielectric material is spaced from both of said electrodes within the space therebetween for dividing the viscous composition into two separated quantities on opposite sides thereof.

References Cited

UNITED STATES PATENTS

| | | | |
|---|---|---|---|
| 2,417,850 | 3/1947 | Winslow | 317—262 X |
| 2,897,425 | 7/1959 | Waring | 192—21.5 X |
| 3,150,678 | 8/1964 | Nuber | 317—262 |
| 3,197,682 | 7/1965 | Klass et al. | 317—262 |
| 2,661,596 | 12/1953 | Winslow | 317—262 X |
| 2,661,825 | 12/1953 | Winslow | 192—21.5 |
| 3,002,596 | 10/1961 | Fitch | 317—262 X |

LEE T. HIX, *Primary Examiner.*

MILTON O. HIRSHFIELD, *Examiner.*